US008185376B2

(12) United States Patent
Chu et al.

(10) Patent No.: US 8,185,376 B2
(45) Date of Patent: May 22, 2012

(54) IDENTIFYING LANGUAGE ORIGIN OF WORDS

(75) Inventors: Min Chu, Beijing (CN); Yi Ning Chen, Beijing (CN); Shiun-Zu Kuo, Bellevue, WA (US); Xiaodong He, Issaquah, WA (US); Megan Riley, Kirkland, WA (US); Kevin E. Feige, Duvall, WA (US); Yifan Gong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1436 days.

(21) Appl. No.: 11/384,401

(22) Filed: Mar. 20, 2006

(65) Prior Publication Data

US 2007/0219777 A1 Sep. 20, 2007

(51) Int. Cl.
*G06F 17/20* (2006.01)
*G06F 17/27* (2006.01)

(52) U.S. Cl. ................................ 704/8; 704/9

(58) Field of Classification Search .................. 704/1–10
See application file for complete search history.

(56) References Cited

U.S. PATENT DOCUMENTS

| | | | | |
|---|---|---|---|---|
| 5,819,247 A * | 10/1998 | Freund et al. | .................. | 706/25 |
| 6,023,670 A * | 2/2000 | Martino et al. | .................. | 704/8 |
| 6,047,251 A * | 4/2000 | Pon et al. | .................. | 704/1 |
| 6,167,369 A * | 12/2000 | Schulze | .................. | 704/9 |
| 6,216,102 B1 * | 4/2001 | Martino et al. | .................. | 704/9 |
| 6,272,456 B1 * | 8/2001 | de Campos | .................. | 704/8 |
| 6,292,772 B1 * | 9/2001 | Kantrowitz | .................. | 704/9 |
| 6,311,152 B1 * | 10/2001 | Bai et al. | .................. | 704/9 |
| 6,415,250 B1 * | 7/2002 | van den Akker | .................. | 704/9 |
| 6,456,991 B1 * | 9/2002 | Srinivasa et al. | .................. | 706/20 |
| 7,139,697 B2 * | 11/2006 | Hakkinen et al. | .................. | 704/9 |
| 7,437,284 B1 * | 10/2008 | Margulies | .................. | 704/7 |
| 7,451,125 B2 * | 11/2008 | Bangalore | .................. | 706/47 |
| 7,552,045 B2 * | 6/2009 | Barliga et al. | .................. | 704/8 |
| 7,562,007 B2 * | 7/2009 | Hwang | .................. | 704/8 |
| 7,676,365 B2 * | 3/2010 | Hwang et al. | .................. | 704/240 |
| 7,689,408 B2 * | 3/2010 | Chen et al. | .................. | 704/8 |
| 7,689,409 B2 * | 3/2010 | Heinecke | .................. | 704/9 |
| 7,818,165 B2 * | 10/2010 | Carlgren et al. | .................. | 704/8 |
| 2004/0006467 A1 * | 1/2004 | Anisimovich et al. | .................. | 704/251 |
| 2004/0138869 A1 * | 7/2004 | Heinecke | .................. | 704/1 |
| 2004/0148170 A1 * | 7/2004 | Acero et al. | .................. | 704/257 |
| 2006/0184357 A1 * | 8/2006 | Ramsey et al. | .................. | 704/9 |
| 2006/0229865 A1 * | 10/2006 | Carlgren et al. | .................. | 704/8 |
| 2007/0219777 A1 * | 9/2007 | Chu et al. | .................. | 704/9 |
| 2007/0299666 A1 * | 12/2007 | Li et al. | .................. | 704/236 |

OTHER PUBLICATIONS

Shlomo Argamon, Navot Akiva, Amihood Amir, Oren Kapah. Efficient Unsupervised Recursive Word Segmentation Using Minimum Description Length. Proceedings of the 20th international conference on Computational Linguistics, 2004.*

Church, Kenneth W. Some Statistical Opportunities in Speech and Language. University of Southern California Marina Del Rey Information Sciences Inst, 1992.*

J Karkkainen and E. Sutinen. Lempel-Ziv Index for q-grams. Algroithmica (1998) 21: 137-154. 1997.*

(Continued)

*Primary Examiner* — David R Hudspeth
*Assistant Examiner* — Matthew Baker
(74) *Attorney, Agent, or Firm* — Steven M. Koehler; Westman, Champlin & Kelly, P.A.

(57) ABSTRACT

The language of origin of a word is determined by analyzing non-uniform letter sequence portions of the word.

12 Claims, 8 Drawing Sheets

OTHER PUBLICATIONS

Stanley F. Chen. Conditional and Joint Models for Grapheme-to-Phoneme Conversion. IBM T.J. Watson Research Center, USA. 8th European Conference on Speech Communication and Technology. Sep. 1-4, 2003.*

Brown, deSouza, Mercer, Pietra, Lai. Class-based n-gram models of natural language. IBM T. J. Watson Research Center. Computational Linguistics vol. 18, Issue 4 (Dec. 1992). MIT Press.*

Manhung Siu Ostendorf, M. Variable n-grams and extensions for conversational speech language modeling. Hong Kong Univ. of Sci. & Technol., Kowloon. Speech and Audio Processing, IEEE Transactions on. Jan. 2000. vol. 8, Issue: 1.*

Dong Zhu, Martine Adda-Decker, Fabien Antoine. Different Size Multilingual Phone Inventories and Context-Dependent Acoustic Models for Language Identification. Interspeech'2005—Eurospeech. Sep. 4-8, 2005.*

Suzuki, I., Mikami, Y., Ohsato, A., Chubachi, Y.: A language and character set determination method based on n-gram statistics. ACM Transactions on Asian Language Information Processing (TALIP) 1(3) (2002) 269-278.*

Cavnar, W.B., Trenkle, J.M.: N-gram-based text categorization. In: Proceedings of SDAIR-94, 3rd Annual Symposium on Document Analysis and Information Retrieval, Las Vegas, US (1994) 161-175.*

Peng, Fuchun, Schuurmans, Dale. Combining Naive Bayes and n-Gram Language Models for Text Classification. 2003. In 25th European Conference on Information Retrieval Research.*

Hakkinen, J.; Jilei Tian; , "n-gram and decision tree based language identification for written words," Automatic Speech Recognition and Understanding, 2001. ASRU '01. IEEE Workshop on , vol., No., pp. 335-338, 2001 URL: http://ieeexplore.ieee.org/stamp/stamp.jsp?tp=&arnumber=1034655&isnumber=22205.*

Zissman, Marc; Singer Elliot. Automatic Language Identification of telephone speech messages using phoneme recognition and n-gram modeling. IEEE 1994. pp. 305-308.*

Kudo, Taku, Matsumoto, Yuji. A Boosting Algorithm for Classifcation of Semi-Structured Text. Proceedings of the 2004 Conference on Empirical Methods in Natural Language Processing. Jun. 30 2004.*

Torres-Carrasquillo, P.A.; Reynolds, D.A.; Deller, J.R., Jr.; , "Language identification using Gaussian mixture model tokenization," Date of Current Version: Apr. 15, 2003.*

Helmut Berger and Dieter Merkl. A Comparison of Text-Categorization Methods Applied to N-Gram Frequency Statistics. Al 2004: Advances in Artificial Intelligence. Lecture Notes in Computer Science, 2005, vol. 3339/2005, 287-326, DOI: 10.1007/978-3-540-30549-1_92.*

A. F. Llitjos and A. Black, "Knowledge of language origin improves pronunciation accuracy of proper names," In Proc. Eurospeech, Aalborg, Denmark, pp. 1919-1922, 2001.

S. Lewis, K. McGrath, and J. Reuppel, "Language Identification and Language Specific Letter-to-Sound Rules," Colorado Research in Linguistics, 17(1), pp. 1-8, 2004.

J Goldsmith, "Unsupervised Learning of the Morphology of a Natural Language," Computational Linguistics, 27(2), pp. 153-198, 2001.

J. Ziv, and A. Lempel, "A Universal Algorithm for Sequential Data Compression," IEEE transactions on information theory, 23(3) pp. 337-343, 1977.

L. Jiang, H.W. Hon, X.D. Huang, "Improvements on a trainable letter-to-sound converter," in Proc. EUROSPEECH, pp. 605-608, 1997.

Y. Freund and R.E. Schapire, "A decision-theoretic generalization of online learning and an application to boosting," J. Comp. & Sys. Sci 55(1), pp. 119-139, 1997.

* cited by examiner

IDENTIFYING LANGUAGE ORIGIN OF WORDS

BACKGROUND

The discussion below is merely provided for general background information and is not intended to be used as an aid in determining the scope of the claimed subject matter.

Using by way of example speech synthesis, text-to-speech technology allows computerized systems to communicate with users using synthesized speech. Some speech synthesizers use letter-to-sound (LTS) conversion to generate the pronunciation of out of the vocabulary (OOV) words. Person names are commonly OOV as well as may originate from other languages. This is true, for example, with English where many person names originate from other languages and their pronunciations are heavily influenced by the rules in the original languages. Therefore, the accuracy of name pronunciation generated from a typical English LTS is normally low. To improve the performance, identifying language origin of a word can be critical.

Language identification has been done for spoken languages. Using one technique, a speech utterance is first converted into a phoneme string by a speech recognition engine, then the probabilities that the phoneme string belongs to each candidate language are estimated by phoneme N-grams of that language, and finally the language with the highest likelihood is selected. Language identification has been also performed on web documents, in which more information such as HTML (Hyper Text Mark-up Language) tag and special letters in different languages can help a lot.

However, the task of identifying language origin of person names in a language, particularly, English can be more difficult during text conversion because all non English characters are normally converted into similar English characters. For example, the German name 'Andrä' is written as Andra in English and the French name 'Aimé' is written as Aime. Hence, many times the letter string is the only information available.

Letter based N-grams have also been used with some success to identify the language origin of names among several candidate languages given a letter string. Typically, a letter based N-gram model has to be trained for each candidate language beforehand. When a new name is analyzed, it will be scored by all letter based N-grams and the language for the letter based N-gram having the highest likelihood will be output as the language hypothesis. Although this technique can be used to hypothesize the language of origin of a word, room exists for improvement when determining language origin from a letter string.

SUMMARY

This Summary and Abstract are provided to introduce some concepts in a simplified form that are further described below in the Detailed Description. This Summary and Abstract are not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

Language of origin analysis of a word includes analyzing non-uniform letter sequence portions of the word. N-gram models based on these chunks are trained for: each language under consideration. Various criteria can be used as a basis for determining the letter chunks. These criteria include but are not limited letter chunks determined using MDL (Minimum Description Length), LZ (Lempel-Ziv) or a closed set. In addition, a new criterion herein described includes syllable-based letter chunks (SBLC). SBLCs are generated by syllabification of letter strings according to the known syllable structure in phoneme strings. Since error distributions from different N-grams can be quite different, they can be combined to achieve more accuracy. One form of combined classifier that can be used is a classifier employing adaptive boosting.

DETAILED DESCRIPTION

One general concept herein described provides for the analysis of a word to hypothesize the language of origin. Analysis includes analyzing non-uniform letter sequence portions of the word. In a further embodiment, analysis includes using N-grams having frequently used letter clusters or chunks. As one criterion, syllable-based letter chunks (SBLC) herein described are used. SBLCs are generated by syllabification of letter strings according to the known syllable structure in phoneme strings. Since the number of possible syllables in languages like English can be very large, in one embodiment, only the most important SBLCs will be selected with respect to the overall coverage of syllables in the language. Although the examples described herein use the Roman alphabet, it should be understood this is not a limitation and that any form of alphabet can be used.

However, before describing further aspects, it may be useful to first describe exemplary computing devices or environments that can implement the description provided below.

Figure 1:
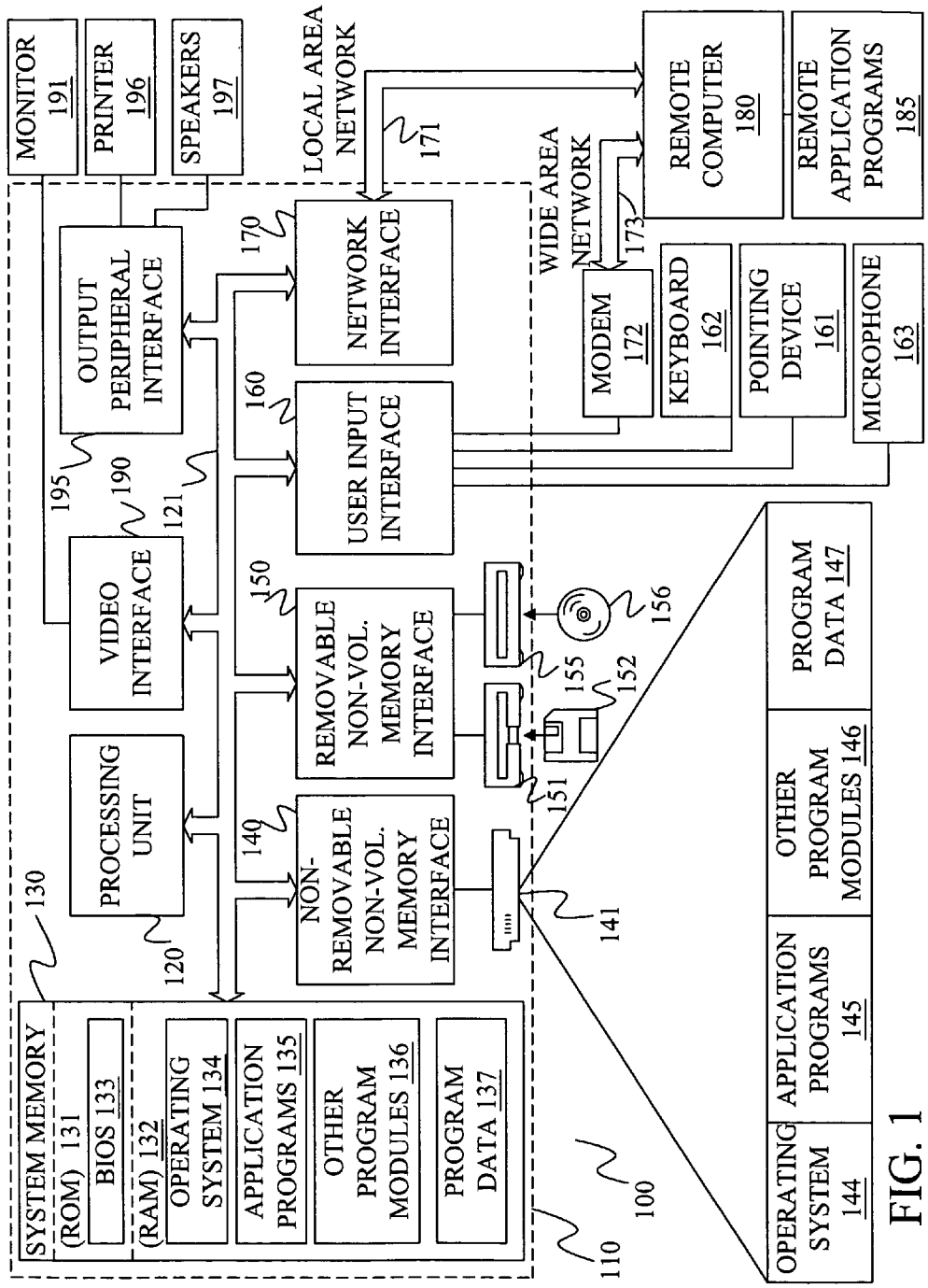
FIG. 1 is a schematic block diagram of an embodiment of a computing environment.

FIG. 1 illustrates an example of a suitable computing system environment 100 on which the concepts herein described may be implemented. The computing system environment 100 is again only one example of a suitable computing environment and is not intended to suggest any limitation as to the scope of use or functionality of the description below. Neither should the computing environment 100 be interpreted as having any dependency or requirement relating to any one or combination of components illustrated in the exemplary operating environment 100.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface card or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the concepts herein described can be carried out on a computer system such as that described with respect to FIG. 1. However, other suitable systems include a server, a computer devoted to message handling, or on a distributed system in which different portions of the concepts are carried out on different parts of the distributed computing system.

Figure 2:
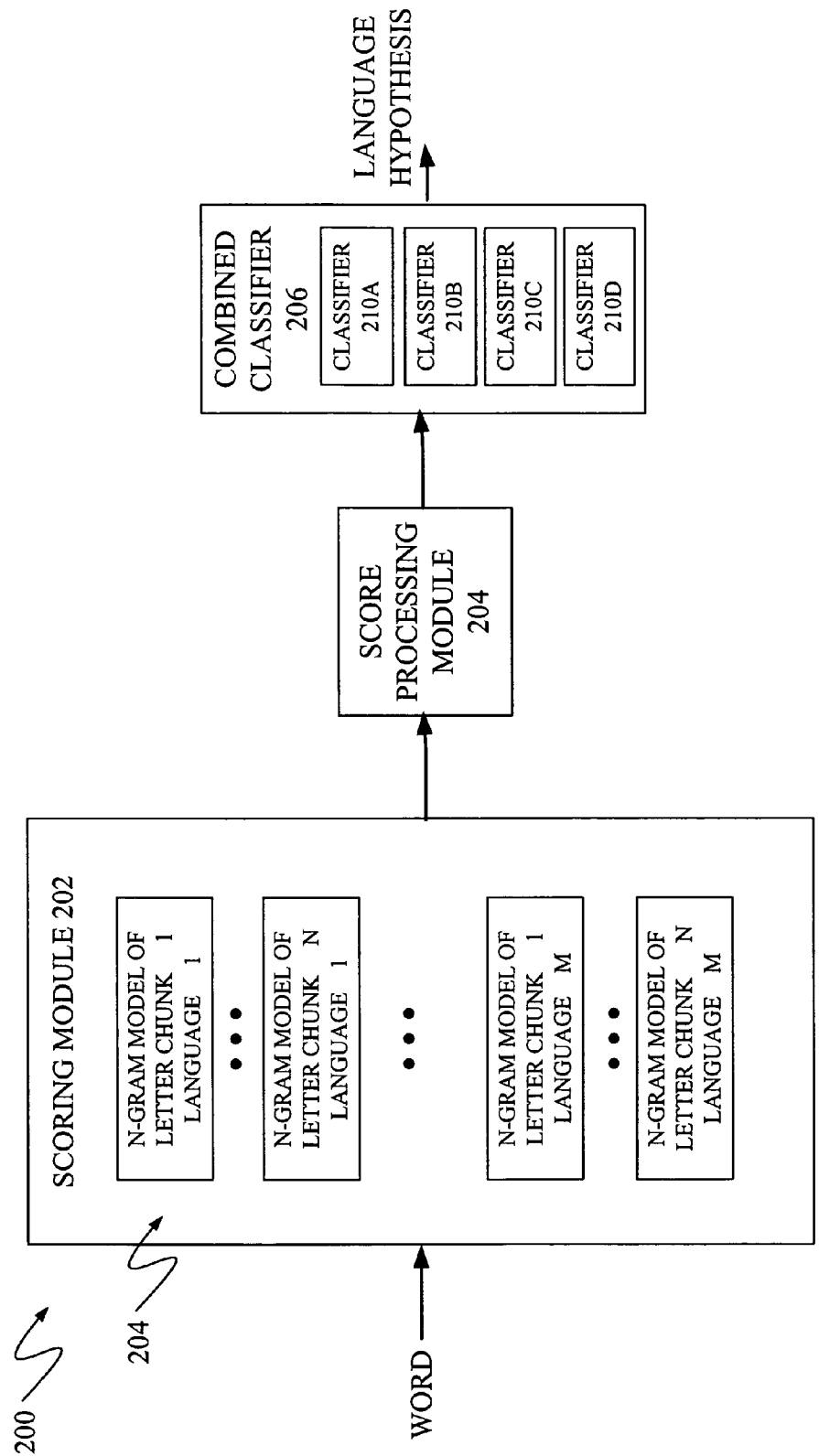
FIG. 2 is a block diagram of a system for ascertaining the language of origin of the word.

As indicated above, one concept herein described provides for the analysis of words to hypothesize the language of origin. Analysis includes using N-grams of frequently used letter clusters or chunks. FIG. 2 illustrates a system 200 for determining a language of origin of words such as but not limited to the names of a persons. System 200 includes a scoring module 202 having or provided access to a plurality of N-gram models of letter chunks 204. Given a name or word under analysis, each N-gram model will provide a score (e.g. a probability) that the language embodied in the N-gram model is the language of origin. The highest score from the scoring module 202 can be used to form a hypothesis for the language of origin. However, in a further embodiment, the scores can be combined or processed by a score processing module 204, for instance, to form a score vector or to calculate the differences between any two scores. The score vector can then be used as input to a combined classifier 206 to obtain a hypothesis for the language of origin.

As indicated above, each N-gram model of the plurality 204 is based on letter chunks or clusters. Unlike a letter based N-gram model that uses a letter as the unit for training, and hence an observation window that is narrow, a letter chunk based N-gram model allows multiple letters, a letter sequence or portion of the word (which can vary in length) to be the unit for training (i.e., a non-uniform unit); therefore, a wider observation window is provided. The wider and variable observation window allows characteristic letter chunks, or at least letter chunks that are used more frequently in a language, to be used in language of origin determination. For instance, the letter chunk 'son' is frequently used in English (such as in "Johnson" and "Thompson"), and therefore, may be helpful in eliminating other languages where this letter chunk is not used as frequently, if at all. Likewise, a word with 'mann' and/or 'berg' (e.g. "Bergemann") may indicate German as the language of origin, while 'jean' can be useful in determining that the word is probably French (e.g. "Jeanloup"). Letter chunks can be generated by adopting various criteria. MDL (Minimum Description Length) and LZ (Lempel-Ziv) is one known criteria that has been widely used in information coding, which can also be used herein. MDL is described by J Goldsmith, in "Unsupervised Learning of the Morphology of a Natural Language," Computational Linguistics, 27(2), pp 153-198, 2001.

Figure 3:
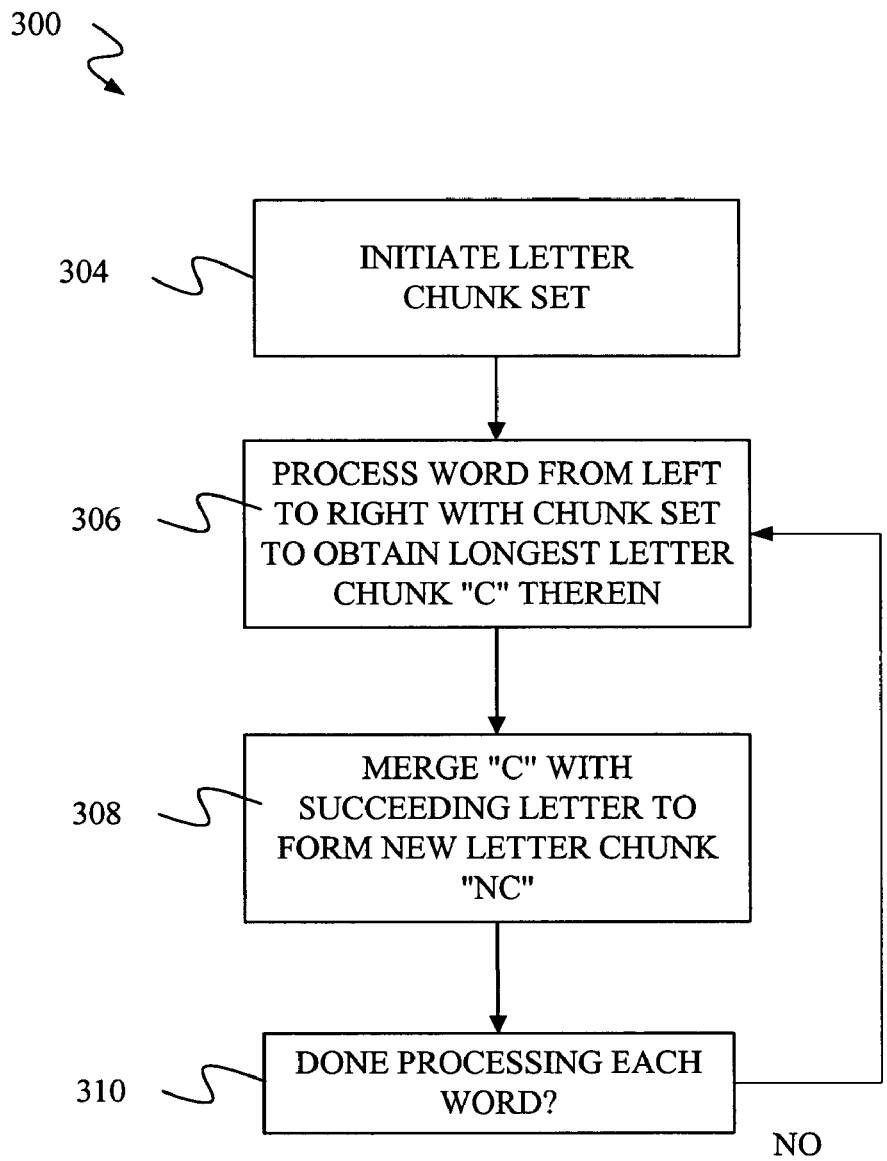
FIG. 3 is a flow chart of the LZ algorithm.

The Lempel-Ziv (LZ) algorithm, which has been used in text compression, can also be used to extract letter chunks. The LZ algorithm is described by J. Ziv, and A. Lempel, in "A Universal Algorithm for Sequential Data Compression," IEEE transactions on information theory, 23(3) pp 337-343, 1977. Referring to FIG. 3, the algorithm 300 includes the steps of: initiating the chunk set, for example, with the 26 English letters (step 304); processing each word (e.g. name) from left to right with the chunk set to obtain the longest letter chunk "C" appearing in it (step 306); merging letter chunk C with its succeeding letter to form a new letter chunk "NC" and adding NC to the chunk set (step 308); and repeating steps 304, 306 and 308 for each word as represented by step 310.

Figure 4:
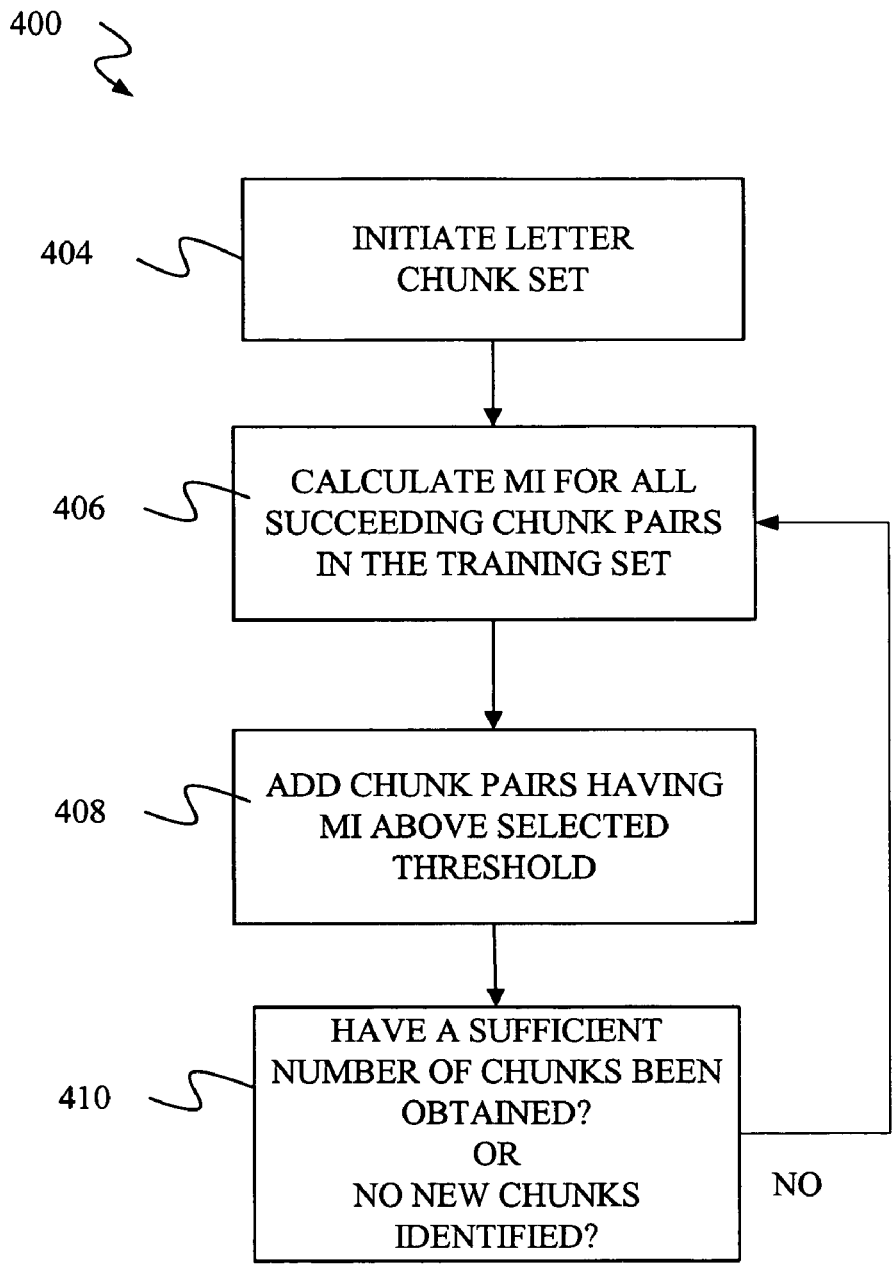
FIG. 4 is a flow chart of the MI algorithm.

Mutual information (MI) among letters can also be a good measure of the co-appearance of succeeding letters. It can be used to identify letter chunks (not necessarily syllables) in a lexicon. The process of identifying letter associations is similar to that of finding word semantic associations. Referring to FIG. 4, the MI algorithm 400 includes the steps of: initiating the chunk set, for example, with the 26 English letters (step 404); calculate MI for all succeeding chunk pairs in the training set (step 406); adding the chunk pairs with MI higher than a preset threshold into the chunk set as a new letter chunk (step 408); and stopping at step 410 if the number of chunks in the set is above a certain number or no new chunk is identified; otherwise repeat from step 404.

The following equation can be used to calculate MI:

$$MI(u_1, u_2) = \frac{N(u_1, u_2)}{M} \times \text{Log} \frac{N(u_1, u_2) \times M}{N(u_1) \times N(u_2)}$$

where, $u_1$, $u_2$ is a pair of succeeding units; M is the total number of units in the training set; and $N(u_i)$ is the occurrence count of unit $u_i$ in the training set.

However, a new criterion: syllable-based letter chunk (SBLC) can also be used. Although the chunks generated with these criteria perform similar when they are used individually, each has its own strength. Therefore, the results from different chunk sets can also be combined, herein represented by combined classifier 206, to determine the language of origin.

It is believed that in most languages, syllables are stable, natural units that carry more language origin than letters. However, in normal TTS (text-to-speech) lexicon, syllable marks are only available in the phoneme string not the letter-string. Therefore, letters may need to be aligned to phonemes to obtain syllable boundaries.

One method for obtaining letter to phoneme alignment is carried out by an iterative Viterbi algorithm, for example as described by L. Jiang, H. W. Hon, X. D. Huang, in "Improvements on a trainable letter-to-sound converter," In Proc. EUROSPEECH, pp 605-608, 1997. In this algorithm, grapheme and phoneme nulls are inserted to ensure one-to-one mapping between letters and phonemes. Then all null grapheme to phoneme pairs are merged with their neighbor pairs and this results in one to one, or one to multiple mapping between letter and phoneme. After the alignment, syllable boundaries marked in phoneme string can be copied directly to the lettering stings.

Figure 5:
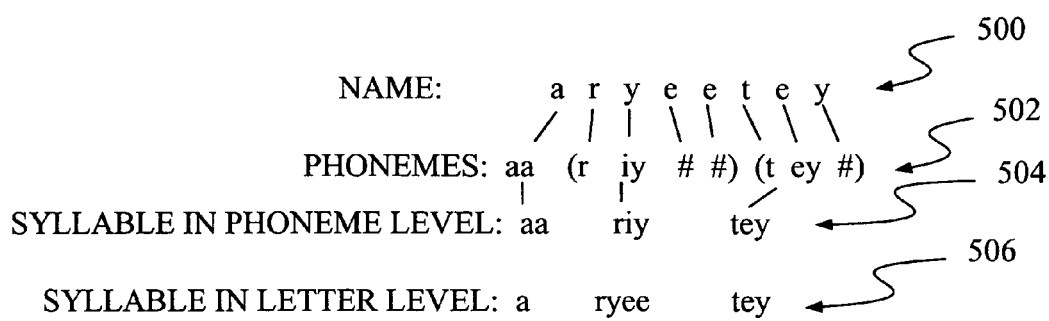
FIG. 5 is a pictorial illustrating associations between phonemes and syllables.

Sometimes letters are aligned to null phonemes in the result. If such pairs are located at syllable boundaries, it is difficult to judge which syllable they belong to. If desired, a rule can be employed such that letter to null phoneme pairs always belong to the syllable before it. FIG. 5 illustrates alignment of letters of the name "Aryeetey" 500 to its corresponding phonemes 502. In this example "e e" maps to null phonemes "# #", but is at the boundary of syllables. Using the rule above, the letters "ee" are associated with the forward syllable at phoneme level. After alignment processing, the syllables of this name on the phoneme level are indicated at 504, while at the letter level are: "a ryee tey" and indicated at 506.

As is appreciated, the total number of syllables in some languages such as western languages is often very large and may not be a closed set. However, it may be necessary to use a finite set of letter chunks in view of processing constraints. Accordingly, using a finite set of letter chunks with frequencies higher than a pre-set threshold or the top "K" letter chunks in a list sorted in descending order of frequency, can be used as base units (herein referred to as "core SBLC"), in N-gram training. The number K is correlated to the overall syllable coverage.

Syllable chunks of valid syllables for pictography languages can also be ascertained. Referring to Chinese by way of example, most Asian languages are character based and each character has a fixed sound when they are written in Romanized letter(s). For example, the first name "Xiaodong" can be decomposed to "Xiao.dong", where each syllable has its corresponding character "曉冬", respectively. Therefore, "xiao" and "dong" can be considered valid syllables for Chinese. Consequently, even though the number of consonants and vowels may be as many or much more than English or other western or European languages, the combinations of consonants and vowels in a syllable are fixed. In other words, it is a closed-set. For example, there are only about 400-500 possible syllables for Mandarin Chinese and about 100-150 possible syllables for Japanese. This applies to other languages (in particular other Asian languages) that use pictographs in their native language, each of which can be converted to Romanized letter sequences.

Since a closed set of syllables is present, this characteristic can be used advantageously. In particular, it is possible to detect "valid" letter chunks with greater confidence based on the closed set, while rejecting possible words when it contains letter sequences that can't be decomposed to a valid letter chunk.

After ascertaining a set of letter chunks, an N-gram model can be trained for the language from a given lexicon. Referring first to SBLC, the training of a SBLC N-gram is quite similar to the training of a letter based N-gram except that, because only part of possible SBLCs in a language are covered by the core SBLC list, the parts not covered can be decomposed by the following rules:

1. If an out of list SBLC contains only one core SBLC as a substring, it is decomposed as the core SBLC plus surrounding letters. For example, "mayne" is a syllable not in core list, and it contains a core SBLC "may", so it is decomposed as "may n e".
2. If a syllable contains more than one core SBLC, it should be decomposed as the longest core SBLC plus surrounding letters. For example, "ckledge" contains core SBLCs: "le", "led", "ckle" and "kledge". The longest core SBLC should be selected and it can be decomposed as "c k ledge".
3. If a syllable does not contain any core SBLC, it should be decomposed into a letter string. For example, "qur" contains no core SBLC, so it is decomposed as "q u r".

With these rules, words in a dictionary can be decomposed into string consisting of core SBLCs and letters, from which N-grams are trained.

To build a list of valid syllables for pictography languages, one uses a lexicon with the pictograph/character and their corresponding Romanized letter sequence. Entries from a Chinese lexicon are provided below by way of example:

| | |
|---|---|
| 何 → | he |
| 曉 → | xiao |
| 冬 → | dong |
| 東 → | dong |
| .... | |

The unique letter sequences in the second column are collected and used as valid syllables; thus, forming the closed set of valid syllables. However, it should be noted that other pictographs may correspond to the same Romanized letter sequence. Typically, the amount of the valid pictographs may be large, but they still comprise a closed set. Moreover, the set of corresponding Romanized syllables is much smaller. Words in a dictionary can then be decomposed into strings consisting of valid syllables, from which N-grams are trained. For example:

何曉東 -> he xiao dong

It should be noted that since multiple chunk sets can be generated with different criteria (MDL, MI, LZ, SBLC, closed set of valid syllables, etc.), multiple N-gram models can be obtained for each language as represented by the multiple N-Gram models (N) provided for each language (M) in FIG. 2.

Figure 6:
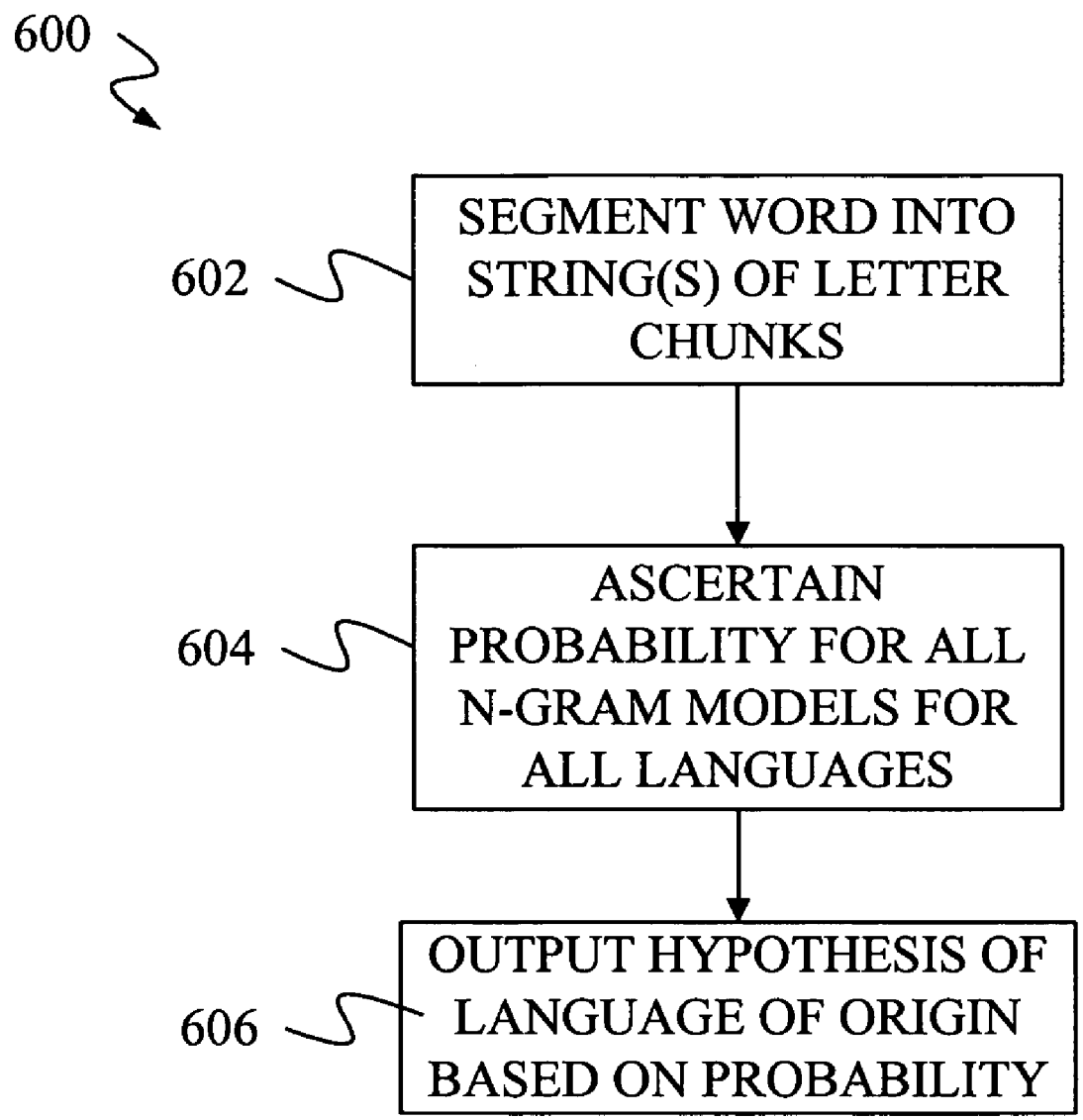
FIG. 6 is a flow chart of operation for the system of FIG. 2.

FIG. 6 illustrates a method 600 for forming a hypothesis of language origin for a word. In order to calculate the likelihood for a word, w, origin from a language l, w has to be segmented into a string(s) of letter chunks in language l, as $\{s1, s2, \ldots, sn\}$ as represented by step 602. For a given chunk set (or a given N-gram model), p(w/l) can be calculated by the following equation:

$$p(w/l) = p(s_1, s_2, \ldots, s_n/l)$$

If tri-gram analysis is adopted, by way of example, the equation can be rewritten as:

$$p(w/l) = p(s_1/l) \times p(s_2/s_1, l) \times \prod_{i=3}^{n} p(s_i/s_{i-1}, s_{i-2}, l)$$

Of course, other forms of N-gram analysis can be used. Normally, there are many possible paths for the segmentation. Searching for the best path is similar to word segmentation with N-gram. For example, when adopting SBLC, the word 'aryeetey' can be segmented to n paths with letter chunks from the core SBLC list.

Name: a r y e e t e y
Path$_1$: a ryee tey
Path$_2$: ar yee tey
...
Path$_n$: a ry ee tey The final path is the one with the highest likelihood for the given N-gram model, where the score is the final likelihood for w belongs to l.

A probability is ascertained that the word is from a language based on the N-gram model(s) at step 604. As exemplified herein a score is calculated with each N-gram model, for each language, if so provided. At step 606, an output hypothesis is obtained based on the ascertained probability. In one embodiment, a simple way to obtain a hypothesis of the language origin of the word is to assign it to the language origin of the N-gram model that got the highest likelihood. Although this technique will provide a hypothesis for the language of origin, further processing of the scores at step 606 can be performed to provide the hypothesis.

Since the error distributions of N-grams of letter chunks generated with different criteria are different, the scores of multiple N-grams can be merged as shown in FIG. 2. Each new word is scored by multiple N-grams of each language and the probabilities from each N-gram form a new feature vector of the word, which is used as the input of the combined classifier 206.

The combined classifier 206 can take any number of forms including Naïve Bayesian decision processing, voting, use of CART (Classification and Regression Tree), use of GMMs (Gaussian Mixture Model) or AdaBoost (adaptive boosting). These techniques are investigated below to identify language origin from the L×M dimension likelihood vector of a word, where L is the number of candidate languages and M is the number of chunk sets per language.

Use of Naïve Bayesian decision can be used to combining results from multiple classifiers. Using this technique, the word is assigned to the language that has a chunk model which achieves the highest likelihood among the L×M scores.

Voting is another simple method to combine different classifiers, i.e. assigning the word to the language that gets the highest vote from all chunk models. If there are two languages getting the same number of votes, the one with the highest likelihood is chosen.

Classification and Regression Tree (CART) is a widely used classifier. This standard statistical method can be used to predict both categorical and continuous data from a set of feature vectors. The tree itself contains yes/no questions about features and ultimately provides either a probability distribution, when predicting categorical values (classification tree), or a mean and standard deviation when predicting continuous values (regression tree). CART can be used to predict the language origin directly from scores of multiple chunk N-grams.

Gaussian Mixture Model (GMM) models the probability density function of observed variables using a multivariate Gaussian mixture density. Given a series of inputs, it refines the weights of each distribution through expectation-maximization algorithms. In the present application, the scores from multiple chunk models are treated as an eigenvector of a word and a GMM is built for each language with such features. When a new word is presented, it is scored by all GMMs and the language corresponding to the highest likelihood is chosen.

AdaBoost is well known and is widely used for combining weak classifiers. Briefly, this algorithm begins by building an initial model from the training dataset. Then, incorrectly classified records are identified and used to train a new model which boosts the importance of these problematic records in the training process. By way of example and in one embodiment, the one dimension naïve Bayesian classifier is adopted as the weak classifier.

Although AdaBoost is designed for two class separation, it is known to make it suitable for multi-class problem. One-against-all is the most popular one and can be used herein. In the one-against-all method for a M class problem, M classifiers are trained. For instance, a classifier is trained for each language under consideration for the language origin of the word. In FIG. 2, classifier 210A is used to ascertain whether the word is English or not, while classifier 210B is used to ascertain whether the word is German or not. Other classifiers can be provided and trained for other languages, each one corresponding to differentiate one class from the others. In the embodiment illustrated, classifier 210C is for French and classifier 210D is for Portuguese. (As appreciated by those skilled in the art, the data used to train each of the classifiers typically is different than the data used to train the N-gram models 204.) The language for the classifier with the highest score will be output as the final hypothesis for the language of origin.

In an alternative form, Adaboost.ecc can be used to handle the multi-classes problem since it may be better than the one-against-all method. Briefly, for a P-class classification problem, each class is assigned an associated code C=($c_1$, ..., $c_Q$) $c_i \in \{1,-1\}$, with length Q (Q>P). For each bit $C_i$, the label is two-class, then the P-class problem becomes Q independent two-class problems. The code can be designed as error correcting code and the redundant information in the code can improve the robustness of the two-class classifiers.

In the ECC framework, for a sample x and class C, there are Q classifiers with outputs $f_1(x), \ldots, f_Q(x)$. The posterior probability of class C is, $$p(C/x) = \prod_{i=1}^{Q} p(c_i/x)$$

$$= \prod_{i=1}^{Q} \frac{\exp(c_i \cdot f_i(x))}{\exp(f_i(x)) + \exp(-f_i(x))}$$

When a word is presented, it is recognized by the Q classifiers. The posterior probability of each language is calculated from the previous equation. The hypothesis with highest posterior probability will be the final output.

Figure 7:
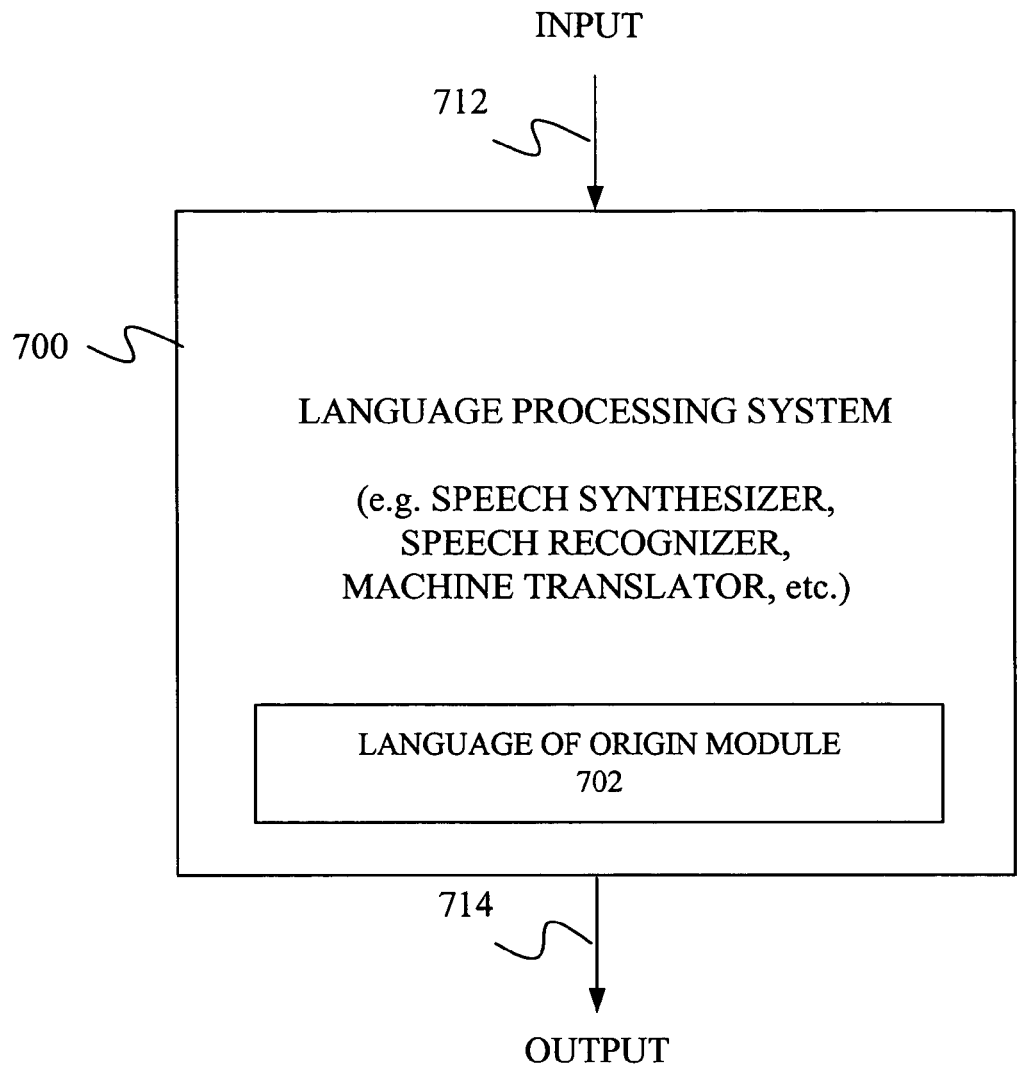
FIG. 7 is a block diagram of the language processing system.

FIG. 7 generally illustrates a language processing system 700 that receives a language input 712 and processes the language input 712 to provide a language output 714. For example, the language processing system 700 can be embodied as a speech synthesizer or module that receives, as the language input 712, text to be spoken. The speech synthesizer processes the text and provides as an output, information used to provide an audible pronunciation of the text.

Language processing system 700 includes a language of origin ascertaining module 702 as herein described for ascertaining the language of origin of selected words.

As appreciated by those skilled in the art, the language of origin ascertaining module 702 can be used in other language processing systems besides the speech synthesizer discussed above. For instance, the language of origin ascertaining module 702 can also be used with speech recognition systems to improve accuracy. However, it should be noted whether the top choice is used, or whether the top "n" choices are used, may depend upon the application. For instance, when module 702 is used in conjunction with a speech synthesizer generally the top choice is used since there exists one opportunity for pronunciation. In contrast, when module 702 is used with speech recognition, use of more than just the top choice may improve recognition. For example, if the speech recognizer uses the top two results, recognition can proceed based on two languages, thereby providing a higher chance of correct name recognition.

Other types of language processing systems 700 include machine translation systems. In particular, machine translation will be able to do a better job when the language origin is known, where the language of origin information allows choice of a suitable set of localized words for the word to be translated. For example, suppose module 702 receives the name "Taro Miwa" in English text as input 712, and attempts to translate it into Chinese as output 714. If upon analysis it is first determined that the input text 712 is Japanese, the appropriate Kanji representation can be found and translated to the correct Chinese name, 三輪太郎, instead of translating it by matching sound, for example realizing, 他偌米瓦, which although sounds closer, is not the correct translation for the inputted Japanese name.

The language processing system 700 can also be used as an aid during testing. For example, the language processing system 700 can receive multi-language words such as personal names and group the words as native or foreign names to ascertain the performance differences between the native and non-native groups. If the performance of an engine (speech synthesizer, speech recognizer, machine translator, etc.) is doing much better on one group of words than the other, this information can be reported to the engine developers. In particular, if the foreign names are organized into more specific language groups, it will help to know which language caused the most problems, thereby focusing development of the engine with that language.

Some language processing systems may include both speech recognition and speech synthesis. For example, an automated telephone call receptionist is required to recognize the name of the desired person the caller is trying to reach. Commonly, this process will also include pronouncing the recognize name in order to obtain confirmation. User frustration can result if the caller perceives an error due to mispronunciation. In particular, the caller may give up in just a few tries if the speech synthesizer continually mispronounces the recognize name even if the speech recognizer did indeed recognize the correct name. In this embodiment, the language processing system 700 can receive lists of foreign words, such as names, and identify the language of origin of each name. The ascertained language of origin can then be included in the grammar, such as a context free grammar (CFG) and used by the speech recognizer and/or speech synthesizer.

Figure 8:
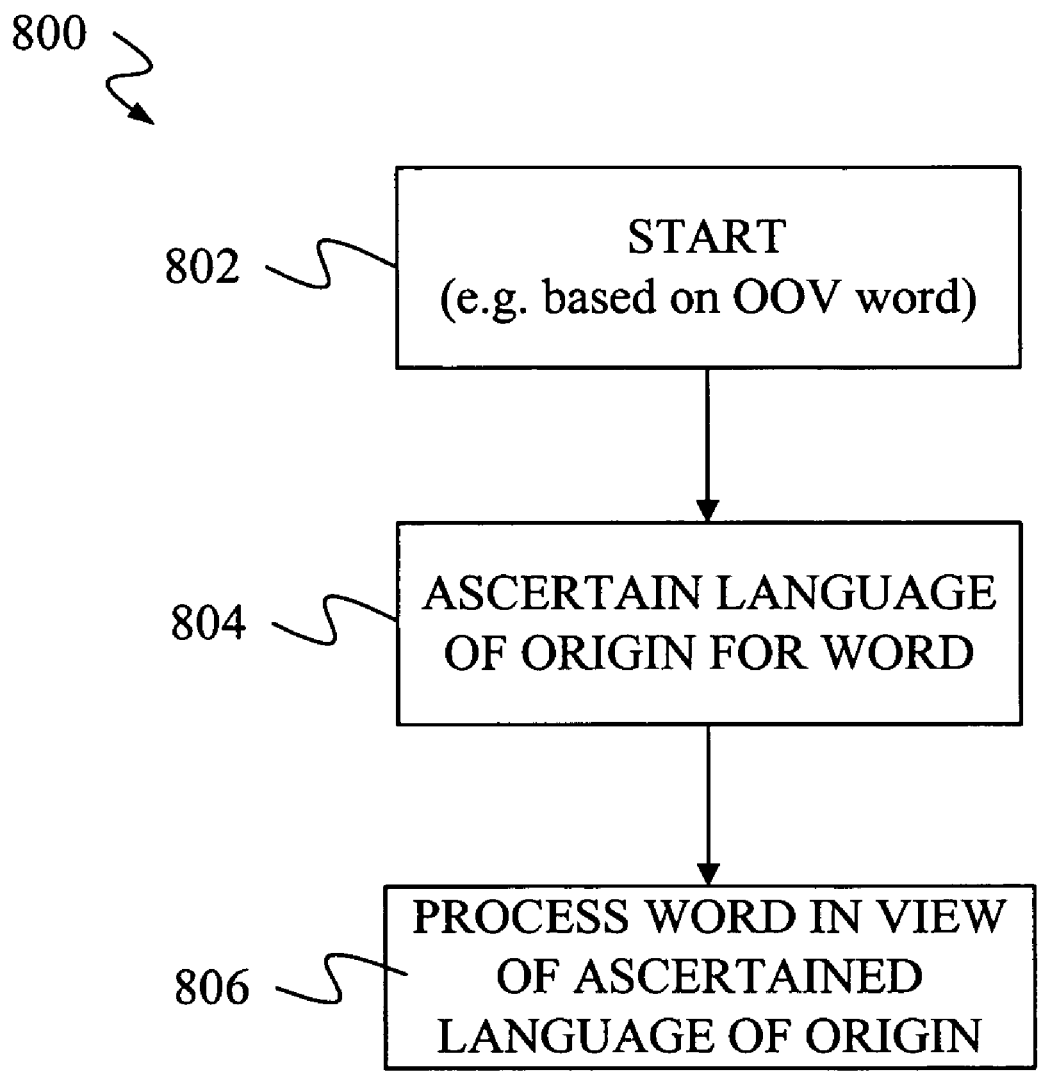
FIG. 8 is a flow chart of operation of the speech synthesizer of FIG. 7.

FIG. 8 illustrates a method of operation 800 for the language processing system 700. Method 800 is initiated at step 802, for example, when the language processing system 700 encounters a word that is OOV. The word can then be provided to the system illustrated in FIGS. 2 and 6 at step 804 to ascertain the language of origin. At step 806, the language processing system 700 executes processing of the word using information or rules associated with language of origin. For example, in the case of a speech synthesizer, the word is pronounced, whereas in speech recognition the output can be used to increase accuracy by identifying the possible countries of origin.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A method for determining a language of origin of a word comprising analyzing non-uniform letter sequence portions of the word, wherein analyzing comprises:
   using one or more processors of a computing system, segmenting the word into strings of letter chunks based on different criteria, the letter chunks being of non-uniform length of one or more letters;
   using one or more processors of a computing system, ascertaining a probability of the word belonging to a selected language by using a plurality of N-gram models based directly on the letter chunks segmented with the different criteria for each of a plurality of different languages, and providing results from using the plurality of N-gram models based directly on letter chunks extracted with the different criteria to a combined classifier that merges the results from the plurality of N-gram models to provide a hypothesis of the language of origin, wherein the combined classifier comprises a plurality of Gaussian mixture models wherein scores from multiple letter chunks models are treated as an eigenvector of a word and a Gaussian mixture model is provided for each of the plurality of different languages, and wherein the results from the plurality of N-gram models are scored by each of the Gaussian mixture models; and
   outputting the hypothesis of the language of origin of the word provided by the combined classifier.

2. The method of claim 1 wherein the step of ascertaining includes using an N-gram model based on syllable-based letter chunk.

3. The method of claim 1 wherein the step of ascertaining includes using a list of selected syllables for the selected language.

4. The method of claim 1 wherein the step of ascertaining includes using an N-gram model based on a language having a closed set of syllables.

5. The method of claim 1, in which the step of ascertaining further comprises comparing the letter chunks with known closed sets of letter chunks corresponding to certain languages having closed sets of possible syllables, and using the known closed sets of letter chunks to detect whether letter chunks are valid and reject possible words that do not correspond to valid letter chunks in the closed sets.

6. The method of claim 1, further comprising using a finite set of letter chunks with frequencies higher than a pre-set threshold in a list sorted in descending order of frequency, as base units in N-gram training in the N-gram model.

7. The method of claim 1 further comprising selecting the word from within a context in a first language and identifying the word as being out of the vocabulary of the first language.

8. A method for determining a language of origin of a word comprising analyzing non-uniform letter sequence portions of the word wherein analyzing comprises:
   using one or more processors of a computing system, segmenting the word into strings of letter chunks based on different criteria, the letter chunks being of non-uniform length of one or more letters;
   using one or more processors of a computing system, ascertaining a probability of the word belonging to a selected language by using a plurality of N-gram models based on the letter chunks segmented with the different criteria for each of a plurality of different languages, and providing results from using the plurality of N-gram models based on letter chunks extracted with the different criteria to a combined classifier that merges the results from the plurality of N-gram models to provide a hypothesis of the language of origin, wherein the combined classifier uses at least one of a first form of adaptive boosting and a second form of adaptive boosting, the first form of adaptive boosting comprising wherein a classifier is provided for and associated with each of the plurality of different languages, each classifier receiving the plurality of results and used to ascertain whether the word is from the associated language or not, and the second form of adaptive boosting comprising calculating a posterior probability for each language; and
   outputting a the hypothesis of the language of origin of the word provided by the combined classifier.

9. The method of claim 8 wherein the step of ascertaining includes using an N-gram model based on at least one of MI (Mutual Information) and MDL (Minimum Description Length) letter chunk.

10. The method of claim 8 wherein the step of ascertaining includes using an N-gram model based on LZ (Lempel-Ziv) letter chunk.

11. The method of claim 8 wherein the step of ascertaining includes using an N-gram model based on syllable-based letter chunk.

12. A method for determining a language of origin of a word comprising analyzing non-uniform letter sequence portions of the word, wherein analyzing comprises:
  using one or more processors of a computing system, segmenting the word into strings of letter chunks based on different criteria, the letter chunks being of non-uniform length of one or more letters;
  using one or more processors of a computing system, ascertaining a probability of the word belonging to a selected language by using a plurality of N-gram models based directly on the letter chunks segmented with the different criteria for each of a plurality of different languages, and providing results from using the plurality of N-gram models based directly on letter chunks extracted with the different criteria to a combined classifier that merges the results from the plurality of N-gram models to provide a hypothesis of the language of origin, wherein the combined classifier comprises a plurality of Gaussian mixture models wherein a Gaussian mixture model is provided for each of the plurality of different languages, and wherein the results from the plurality of N-gram models are scored by each of the Gaussian mixture models; and
  outputting the hypothesis of the language of origin of the word provided by the combined classifier.

* * * * *

UNITED STATES PATENT AND TRADEMARK OFFICE
CERTIFICATE OF CORRECTION

| | | |
|---|---|---|
| PATENT NO. | : 8,185,376 B2 | Page 1 of 1 |
| APPLICATION NO. | : 11/384401 | |
| DATED | : May 22, 2012 | |
| INVENTOR(S) | : Chu et al. | |

It is certified that error appears in the above-identified patent and that said Letters Patent is hereby corrected as shown below:

Title Page 2, in Item [56], under "Other Publications" column 2, lines 4-5, delete "Classifcation" and insert -- classification --, therefor.

In the Claims

Column 12, line 62, Claim 8, after "outputting" delete "a".

Signed and Sealed this
Seventeenth Day of February, 2015

Michelle K. Lee
*Deputy Director of the United States Patent and Trademark Office*